(12) United States Patent
Fuldseth et al.

(10) Patent No.: US 10,171,810 B2
(45) Date of Patent: Jan. 1, 2019

(54) TRANSFORM COEFFICIENT CODING USING LEVEL-MODE AND RUN-MODE

(71) Applicant: Cisco Technology, Inc., San Jose, CA (US)

(72) Inventors: Arild Fuldseth, Lysaker (NO); Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 14/995,512

(22) Filed: Jan. 14, 2016

(65) Prior Publication Data

US 2016/0373749 A1 Dec. 22, 2016

Related U.S. Application Data

(63) Continuation of application No. 62/182,852, filed on Jun. 22, 2015.

(51) Int. Cl.
| | |
|---|---|
| *G06K 9/36* | (2006.01) |
| *H03M 7/00* | (2006.01) |
| *H04N 7/12* | (2006.01) |
| *H04N 11/02* | (2006.01) |
| *H04N 19/13* | (2014.01) |
| *H04N 19/103* | (2014.01) |
| *H04N 19/136* | (2014.01) |
| *H04N 19/18* | (2014.01) |

(52) U.S. Cl.
CPC .......... *H04N 19/13* (2014.11); *H04N 19/103* (2014.11); *H04N 19/136* (2014.11); *H04N 19/18* (2014.11)

(58) Field of Classification Search
None
See application file for complete search history.

(56) References Cited

U.S. PATENT DOCUMENTS

| | | | |
|---|---|---|---|
| 3,883,847 | A | 5/1975 | Frank |
| 4,698,672 | A | 10/1987 | Chen |
| 4,725,885 | A | 2/1988 | Gonzales |
| 4,813,056 | A | 3/1989 | Fedele |

(Continued)

FOREIGN PATENT DOCUMENTS

| | | |
|---|---|---|
| JP | 2004104159 | 4/2004 |
| WO | 03084241 A2 | 10/2003 |

*Primary Examiner* — James M Pontius
*Assistant Examiner* — Susan E. Hodges
(74) *Attorney, Agent, or Firm* — Edell, Shapiro & Finnan, LLC (57) ABSTRACT

Video transform coefficient encoding and decoding methods are provided. A two-dimensional array of quantized transform coefficients are obtained for a block of a video frame. The two-dimensional array of quantized transform coefficients are converted to a one-dimensional array of integer samples using a scan pattern, wherein each sample is represented with a level that is an absolute value of the sample and a sign bit if the level is greater than zero. The one-dimensional array of samples is converted to a bit-stream by processing the one-dimensional array of samples in sequential order. A switch is adaptively made between multiple coding modes, where each coding mode is characterized by how consecutive coefficients are jointly coded as a single event. For each mode, a switch may be adaptively made between various variable length code (VLC) tables.

25 Claims, 7 Drawing Sheets

(56) References Cited

U.S. PATENT DOCUMENTS

| | | |
|---|---|---|
| 4,901,075 A | 2/1990 | Vogel |
| 4,939,583 A | 7/1990 | Tsuboi |
| 5,497,153 A | 3/1996 | Jeong |
| 5,579,413 A | 11/1996 | Bjontegaard |
| 5,606,370 A | 2/1997 | Moon |
| 5,793,897 A | 8/1998 | Jo et al. |
| 5,821,886 A | 10/1998 | Son |
| 5,982,437 A | 11/1999 | Okazaki |
| 5,999,111 A | 12/1999 | Park |
| 6,552,674 B2 | 4/2003 | Cheung |
| 6,563,953 B2 | 5/2003 | Lin |
| 6,608,939 B2 | 8/2003 | Matsumoto |
| 6,622,145 B2 | 9/2003 | Kerofsky |
| 6,636,168 B2 | 10/2003 | Ohashi |
| 6,646,578 B1 | 11/2003 | Au |
| 6,658,152 B2 | 12/2003 | Matsumoto |
| 6,677,868 B2 | 1/2004 | Kerofsky |
| 6,681,048 B2 | 1/2004 | Matsumoto |
| 6,690,307 B2 | 2/2004 | Karczewicz |
| 6,696,993 B2 | 2/2004 | Karczewicz |
| 6,697,527 B2 | 2/2004 | Matsumoto |
| 6,735,345 B2 | 5/2004 | Lin |
| 6,744,387 B2 | 6/2004 | Winger |
| 6,795,584 B2 | 9/2004 | Karczewicz |
| 6,798,916 B2 | 9/2004 | Matsumoto |
| 6,801,668 B2 | 10/2004 | Frojdh |
| 6,812,873 B1 | 11/2004 | Siohan et al. |
| 6,856,701 B2 | 2/2005 | Karczewicz |
| 6,879,268 B2 | 4/2005 | Karczewicz |
| 6,917,651 B1 | 7/2005 | Yoo |
| 6,954,157 B2 | 10/2005 | Kadono |
| 6,967,600 B2 | 11/2005 | Kadono |
| 6,992,605 B2 | 1/2006 | Kadono |
| 7,095,896 B2 | 8/2006 | Abe |
| 7,099,387 B2 | 8/2006 | Bjontegaard |
| 7,109,898 B2 | 9/2006 | Kadono |
| 7,158,684 B2 | 1/2007 | Cheung |
| 7,184,598 B2 | 2/2007 | Abe |
| 7,251,371 B2 | 7/2007 | Kobayashi |
| 7,283,071 B2 | 10/2007 | Kadono |
| 7,289,673 B2 | 10/2007 | Lin |
| 7,305,035 B2 | 12/2007 | Kondo |
| 7,305,134 B2 | 12/2007 | Abe |
| 7,308,143 B2 | 12/2007 | Abe |
| 7,308,144 B2 | 12/2007 | Abe |
| 7,308,149 B2 | 12/2007 | Abe |
| 7,312,731 B2 | 12/2007 | Kadono |
| 7,342,965 B2 | 3/2008 | Lainema |
| 7,379,608 B2 | 5/2008 | Marpe |
| 7,411,526 B2 | 8/2008 | Kadono |
| 7,596,279 B2 | 9/2009 | Sugimoto et al. |
| 7,702,013 B2 | 4/2010 | Schwartz |
| 7,920,629 B2 | 4/2011 | Bjontegaard et al. |
| 7,974,343 B2 | 7/2011 | Gao et al. |
| 8,121,188 B2 | 2/2012 | Marpe et al. |
| 8,306,347 B2 | 11/2012 | Bjontegaard et al. |
| 8,335,261 B2 | 12/2012 | Karczewicz et al. |
| 8,422,809 B2 | 4/2013 | Adachi et al. |
| 8,483,500 B2 | 7/2013 | Nguyen et al. |
| 8,565,314 B2 | 10/2013 | Karczewicz et al. |
| 8,712,783 B2 | 4/2014 | Mehrotra et al. |
| 8,737,473 B2 | 5/2014 | Abe et al. |
| 8,781,001 B2 | 7/2014 | Sasai |
| 8,811,479 B2 | 8/2014 | Cheon |
| 8,941,514 B2 | 1/2015 | Kadono et al. |
| 9,020,040 B2 | 4/2015 | Kondo et al. |
| 2004/0234144 A1 | 11/2004 | Sugimoto et al. |
| 2006/0171463 A1* | 8/2006 | Hanamura ......... H04N 21/2662 375/240.13 |
| 2008/0260037 A1* | 10/2008 | Kondo ................ H03M 7/40 375/240.23 |
| 2010/0150226 A1* | 6/2010 | Hallapuro ............ H04N 19/13 375/240.03 |
| 2013/0003859 A1* | 1/2013 | Karczewicz .......... H04N 19/70 375/240.24 |
| 2013/0188736 A1* | 7/2013 | Kim .................... H04N 19/176 375/240.25 |

* cited by examiner

TRANSFORM COEFFICIENT CODING USING LEVEL-MODE AND RUN-MODE

CROSS REFERENCE TO RELATED APPLICATION

This application claims priority to U.S. Provisional Patent Application No. 62/182,852, filed Jun. 22, 2015, the entirety of which is incorporated herein by reference.

TECHNICAL FIELD

The present disclosure relates to video encoding and decoding technology.

BACKGROUND

Video encoding and decoding is used to transmit and receive video content over communication networks. There are continuous efforts being made in this technology to improve the quality of the video given the bandwidth of the communication channel over which the video streams are sent.

DESCRIPTION OF EXAMPLE EMBODIMENTS

Overview

In accordance with one embodiment, a transform coefficient decoding method is provided. An encoded bit-stream is received that represents video frames. Levels and sign bits representing quantized transform coefficients are decoded from the encoded bit-stream in a level-mode or a run-mode. In the level-mode, each sample is individually decoded by decoding a level from the bit-stream, and if the level is greater than zero, the sign bit is decoded from the bit-stream. If the level is less than a first threshold, a switch is made to the run-mode. In the run-mode, a combined event is decoded from the bit-stream, of: length of a zero-run corresponding to a number of zeros since a last non-zero level; and whether the level is greater than one. A switch is made to the level-mode for a next sample when the level is greater than a second threshold. Levels and sign bits resulting from the decoding are combined into a one-dimensional array of integer samples in sequential order. Using an inverse scan pattern, the one-dimensional array of integer samples is converted to a two-dimensional array of integer samples representing a block of quantized transform coefficients.

Detailed Description

Figure 1:
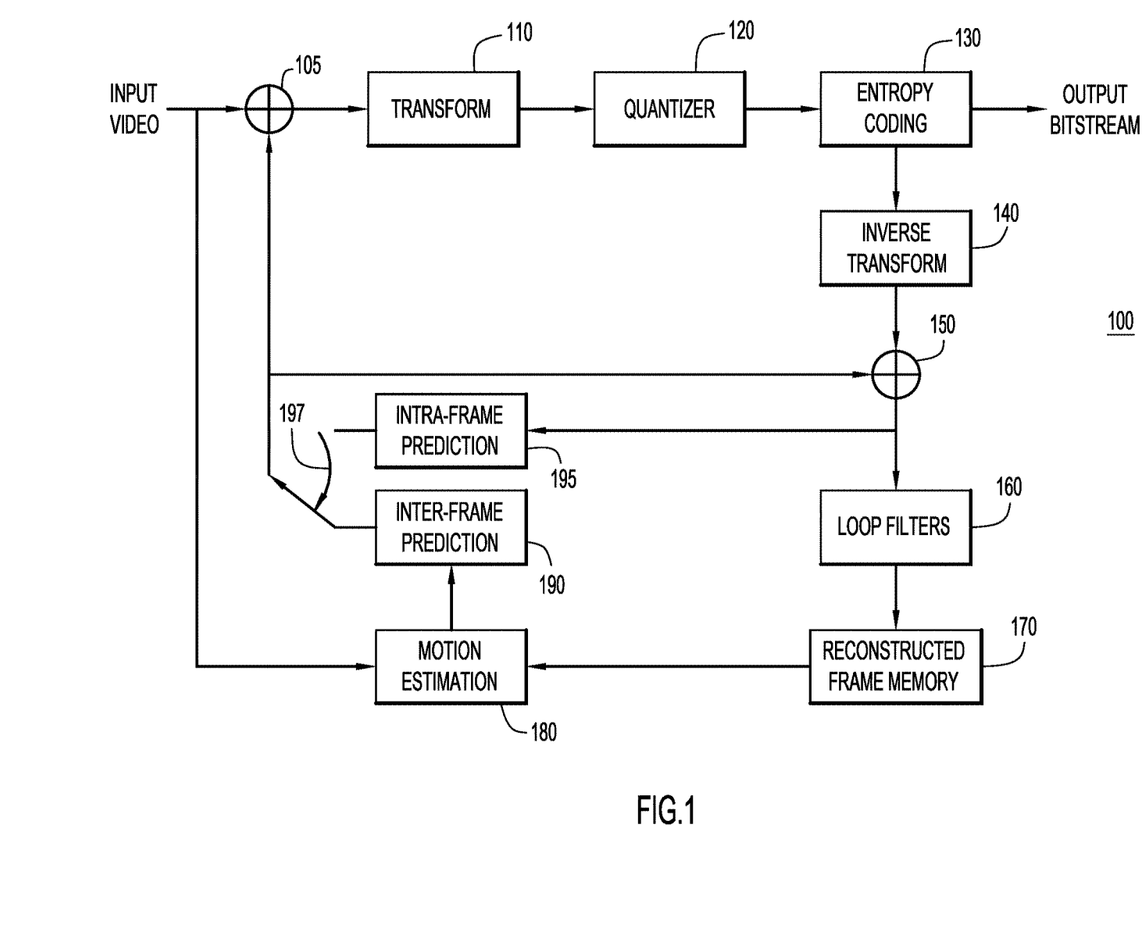
FIG. 1 is a block diagram of a video encoder according to an example embodiment.

Referring first to FIG. 1, a block diagram of a video encoder is shown at reference numeral 100. The video encoder 100 includes a subtractor 105, a transform unit 110, a quantizer unit 120, an entropy coding unit 130, an inverse transform unit 140, an adder 150, one or more loop filters 160, a reconstructed frame memory 170, a motion estimation unit 180, an inter-frame prediction unit 190, an intra-frame prediction unit 195 and a switch 197.

A current frame (input video) as well as a prediction frame are input to a subtractor 105. The subtractor 105 is provided with input from either the inter-frame prediction unit 190 or intra-frame prediction unit 195, the selection of which is controlled by switch 197. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 180 supplies a motion estimation output as input to the inter-frame prediction unit 190. The motion estimation unit 180 receives as input the input video and an output of the reconstructed frame memory 170.

The subtractor 105 subtracts the output of the switch 197 from the pixels of the current frame, prior to being subjected to a two dimensional transform process by the transform unit 110 to produce transform coefficients. The transform coefficients are then subjected to quantization by quantizer unit 120 and then supplied to entropy coding unit 130. Entropy coding unit 130 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 120 is also applied to the inverse transform unit 140 and used for assisting in prediction processing. The adder 150 adds the output of the inverse transform unit 140 and an output of the switch 197 (either the output of the inter-frame prediction unit 190 or the intra-frame prediction unit 195). The output of the adder 150 is supplied to the input of the intra-frame prediction unit 195 and to one or more loop filters 160 which suppress some of the sharpness in the edges to improve clarity and better support prediction processing. The output of the loop filters 160 is applied to a reconstructed frame memory 170 that holds the processed image pixel data in memory for use in subsequent motion processing by motion estimation block 180.

Figure 2:
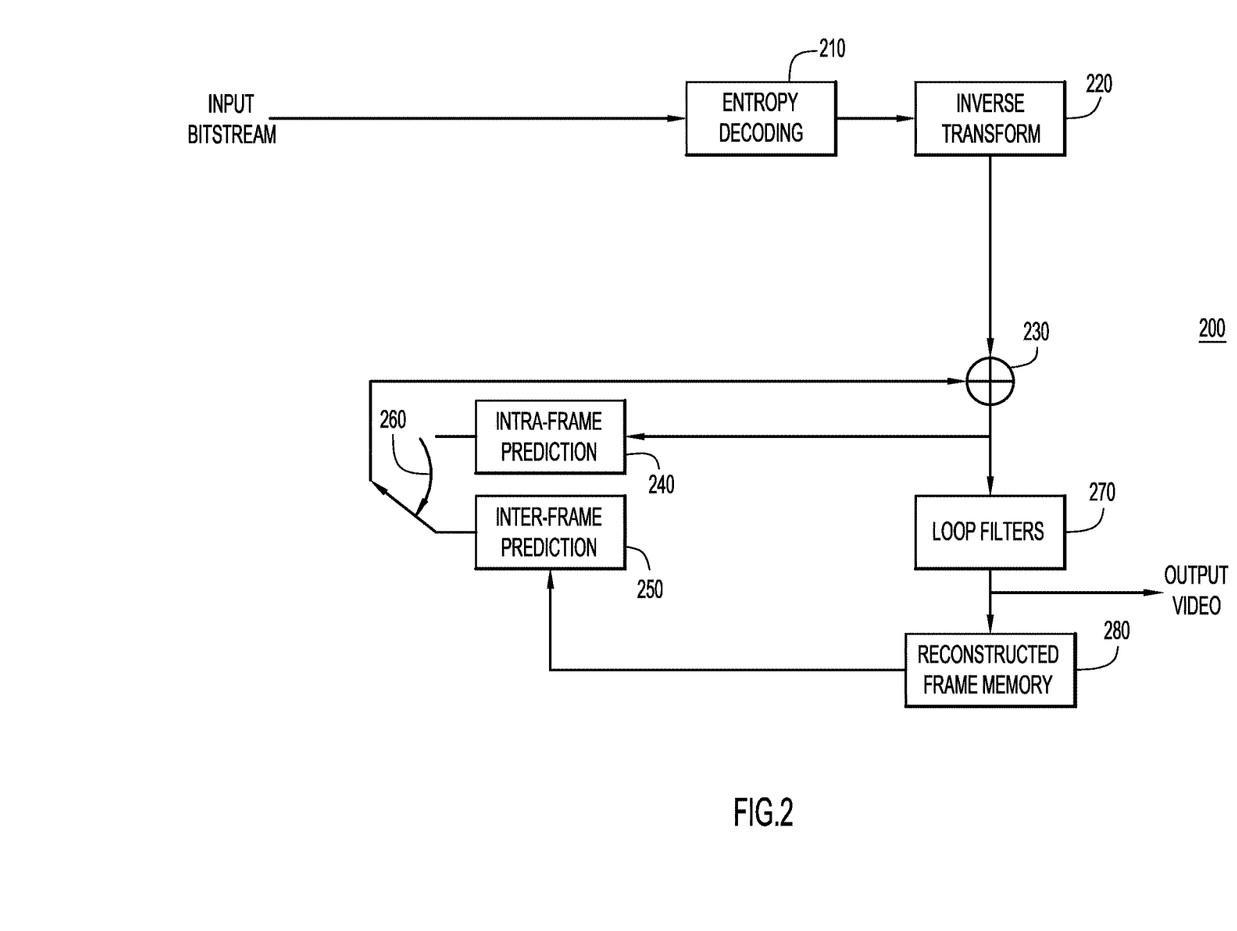
FIG. 2 is a block diagram of a video decoder according to an example embodiment.

Turning to FIG. 2, a block diagram of a video decoder is shown at reference numeral 200. The video decoder 200 includes an entropy decoding unit 210, an inverse transform unit 220, an adder 230, an intra-frame prediction unit 240, an inter-frame prediction unit 250, a switch 260, one or more loop filters 270 and a reconstructed frame memory 280. The entropy decoding unit 210 performs entropy decoding on the received input bitstream to produce quantized transform coefficients which are applied to the inverse transform unit 220. The inverse transform unit 220 applies two-dimensional inverse transformation on the quantized transform coefficients to output a quantized version of the difference samples. The output of the inverse transform unit 220 is applied to the adder 230. The adder 230 adds to the output of the inverse transform unit 220 an output of either the intra-frame prediction unit 240 or inter-frame prediction unit 250. The loop filters 270 operate similar to that of the loop filters 160 in the video encoder 100 of FIG. 1. An output video image is taken at the output of the loop filters 270.

The video encoder 100 of FIG. 1 and the video decoder of FIG. 2 may be implemented by digital logic gates in an integrated circuit (e.g., by an application specific integrated circuit) or by two or more separate logic devices. Alternatively, the video encoder 100 and video decoder 200 may be implemented by software executed by one or more processors, as described further in connection with FIG. 6, below.

Each of the functional blocks in FIGS. 1 and 2 are executed for each coding block, prediction block, or transform block.

Presented herein are techniques for non-arithmetic and coding and decoding of transform coefficients using adaptation between run-mode and level-mode. This achieves efficient bit representation of quantized transform coefficients using forward scan and without large tables or the added complexity of an arithmetic engine.

Figure 3:
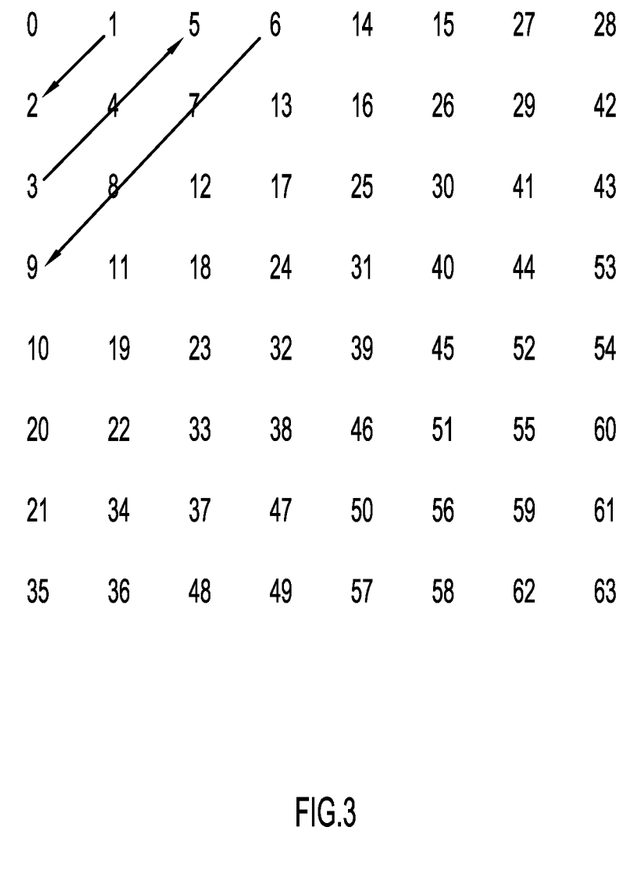
FIG. 3 illustrates a scan pattern for a two-dimensional array of transform coefficients according to an example embodiment.

Reference is now made to FIG. 3. In one example, transform coefficient coding uses a zig-zag scan pattern to convert a two-dimensional (2D) array of quantized transform coefficients to a one-dimensional (1D) array of integer samples. Variable length code (VLC) coding of quantized transform coefficients starts from the "low frequency end" of the 1D array using two different modes; level-mode and run-mode, and starting in level-mode.

Generally, the transform coefficient coding scheme presented herein operates as follows. A two-dimensional array of quantized transform coefficients are obtained for a block of a video frame. The two-dimensional array of quantized transform coefficients are converted to a one-dimensional array of integer samples using a scan pattern, wherein each sample is represented with a level that is an absolute value of the sample and a sign bit if the level is greater than zero. The one-dimensional array of samples is converted to a bit-stream by processing the one-dimensional array of samples in sequential order.

A switch is adaptively made between multiple coding modes, where each coding mode is characterized by how consecutive coefficients are jointly coded as a single event, including coding each coefficient separately as a possible mode. The mode can be derived implicitly from previously transmitted coefficients, or it can also be transmitted explicitly. For each mode, a switch may also be adaptively made between various variable length code (VLC) tables. The VLC table can be derived implicitly from previously transmitted coefficients or it can be transmitted explicitly. For at least one of the modes and for at least one of the VLC tables, a special binary codeword is reserved for end of block (EOB), i.e., no more non-zero coefficients, to terminate the coefficient coding process of the block.

One example embodiment of a transform coefficient coding scheme is now more specifically described. This example embodiment is not meant to be limiting.

Level-Mode

Each sample is encoded separately. Each sample is encoded by:
  a. The absolute value, level=abs(sample), using a VLC code; and
  b. If level>0, the sign bit (sign=0 or sign=1 for sample>0 and sample<0, respectively).

For encoding the absolute values, a switch is made between two different VLC tables (VLC0 and VLC1), where the VLC table used for sample N depends on the absolute value of sample N−1. In one example, a switch is made from VLC0 to VLC1 if level>3.

If sample N is less than a first threshold, a switch is made to run-mode, starting from sample N+1. In one example, a switch is made if sample N=0.

Run-Mode

For each non-zero sample level, the combined event of the following is encoded:
  1) Length of the "zero-run", i.e., the number of zeros since the last non-zero level.
  2) Whether or not level=abs(sample) is greater than 1.
  3) End of block (EOB) indicating that there are no more non-zero samples.

Additionally, if level=1, the sign bit is encoded.
Additionally, if level>1 define code=2*(level−2)+sign.

If the absolute value of sample N is larger than a second threshold, a switch is made to level-mode, starting from sample N+1. The second threshold may be, for example, one (1).

Figure 4:
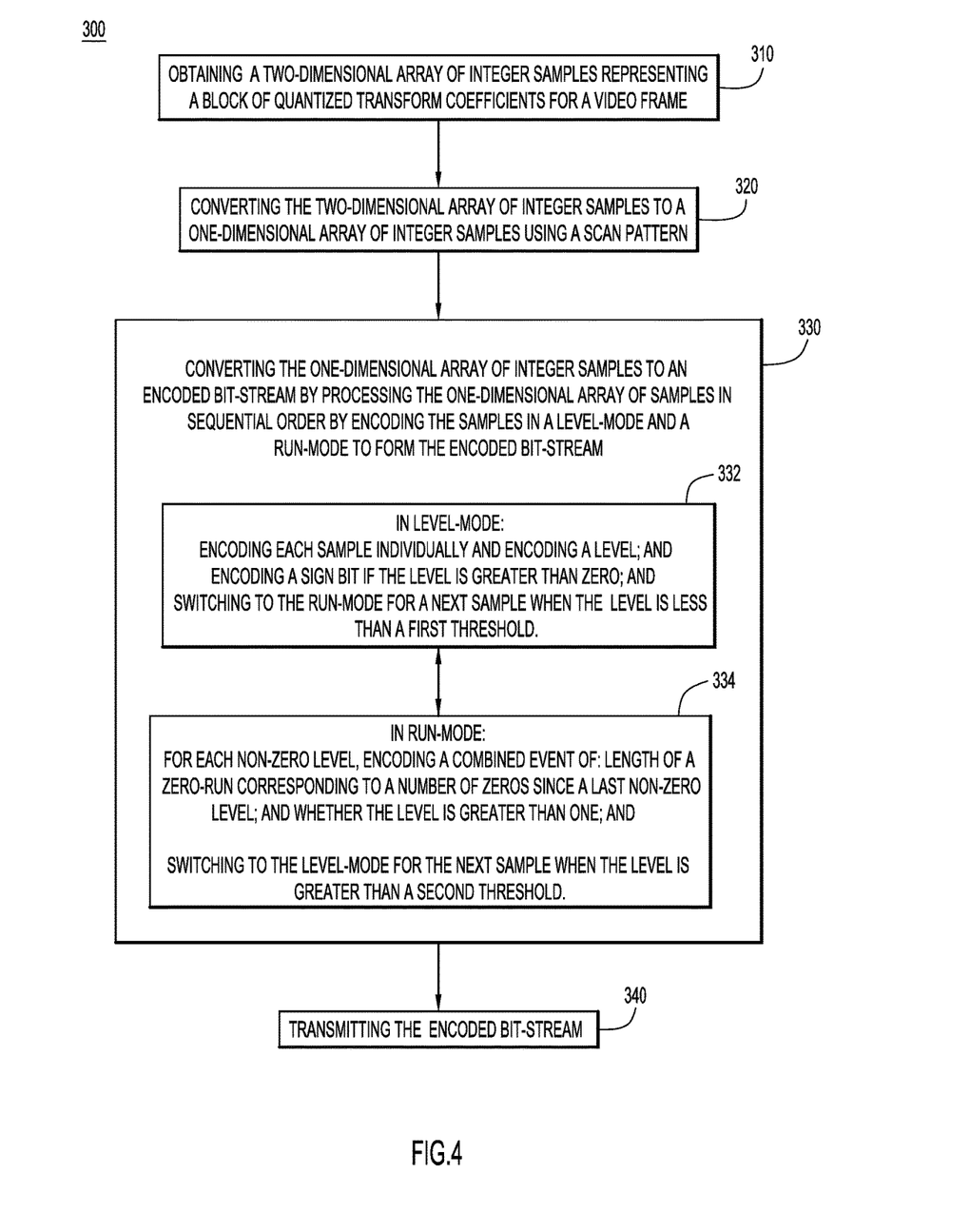
FIG. 4 is a flow chart of a transform coefficient encoding method performing by an encoder according to an example embodiment.

Turning now to FIG. 4, a flow chart will be described for a process 300 performed by an encoder, e.g., an encoder as shown in FIG. 1. That is, the transform unit 110 applies a transform to generate unquantized transform coefficients, e.g., 127, 44, 42, 11, etc., and the quantizer 120 applies quantization process to generate integer samples, e.g., 13, 4, 4, 1, etc., that represent a block of quantized transform coefficients for a video frame. The input to the process 300 is the output of the quantizer 120. Thus, this process may be performed by the entropy coding unit 130.

At 310, a two-dimensional array of integer samples is obtained. The two-dimensional array of integer samples represents a block of quantized transform coefficients for a video frame. Again, this is the output of the quantizer 120 shown in FIG. 1, as an example.

At 320, the two-dimensional array of integer samples is converted to a one-dimensional array of integer samples using a scan pattern. Each integer sample is represented with a level that is an absolute value of the sample and a sign bit if the level is greater than zero.

At 330, the one-dimensional array of integer samples are converted to an encoded bit-stream by processing the one-dimensional array of integer samples in sequential order byencoding the samples in a level-mode and a run-mode to form the encoded bit-stream.

The operations of 332 are performed when in the level-mode. In level-mode, each sample is encoded individually and a level of the sample is encoded, and a sign bit is encoded if the level is greater than zero. Moreover, a switch is made to the run-mode for the next sample when the level is less than a first threshold. In one example, the first threshold may such that the switch is made to the run-mode when the level is equal to zero.

Encoding the level may use one of a first variable length code and a second variable length code. Moreover, encoding the level may involve switching between the first variable length code and the second variable length code based on the absolute value of a previous sample. Switching between the first variable length code and the second variable length code may involve switching from the first variable length code to the second variable length code when the absolute value of the previous sample is greater than a predetermined integer greater than 2. The predetermined integer may be 3, in one example.

The operations of 334 are performed when in the run-mode. In run-mode, for each non-zero level, a combined event is encoded of: length of zero-run corresponding to a number of zeros since a last non-zero level; and whether the level is greater than one (1). A switch is made to the level-mode for the next sample when the level is greater than a second threshold. The second threshold may be one (1).

When in the run-mode, when the level is equal to one, encoding may involve encoding the sign bit. When the level is greater than one, the level and sign bit may be encoded jointly or separately. For example, when the level is greater than one, the combined event may be encoded with a code equal to 2*(level−2)+sign.

Furthermore, an indicator may be included in the encoded bit-stream to indicate to a decoder to switch between level-mode and run-mode. Encoding the combined event may involve including a binary codeword that indicates end of block when there are no more non-zero samples.

As shown in FIG. 4, the encoding may involve repeatedly switching between the level-mode and the run-mode, until an end of block condition occurs. When end of block occurs, then at 340, the encoded bit-stream can be transmitted.

Figure 5:
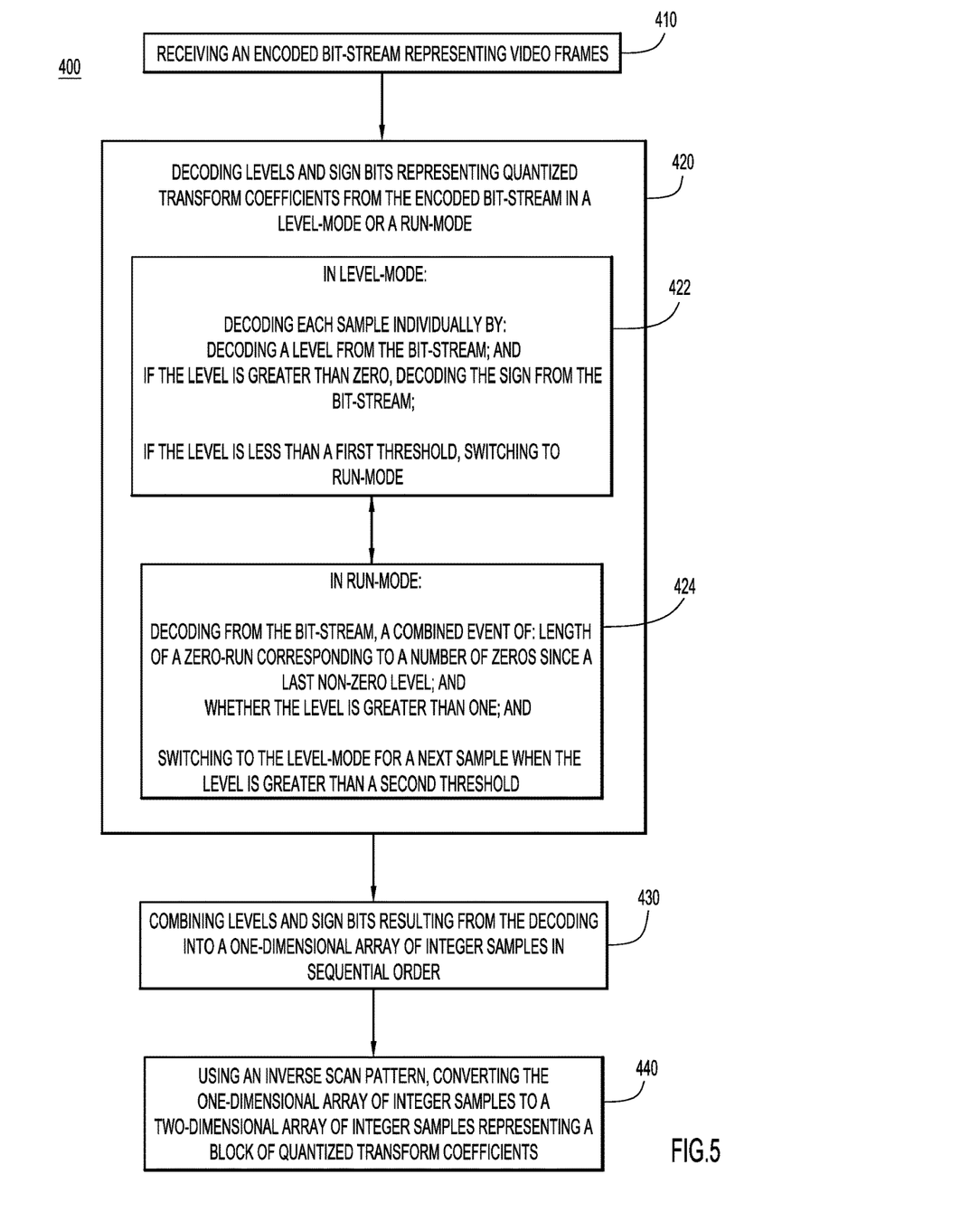
FIG. 5 is a flow chart of a transform coefficient decoding method performed by a decoder according to an example embodiment.

Turning now to FIG. 5, a diagram is shown for a process 400 performed by a decoder, e.g., a decoder as shown in FIG. 2. The entropy decoding unit 210 may perform process 400, and the output of this process may be supplied to the input of the inverse transform unit 220.

At 410, an encoded bit-stream representing video frames is received. At 420, levels and sign bits representing quantized transform coefficients are decoded from the encoded bit-stream in a level-mode or a run-mode. More specifically, at 422, in level-mode, each sample is individually decoded by decoding a level from the bit-stream, and if the level is greater than zero, the sign bit from the bit-stream is decoded. If the level is less than a first threshold, a switch is made to the run-mode. In one example, the first threshold may such that the switch is made to the run-mode when the level is equal to zero.

In the level-mode, decoding may use one of a first variable length code and a second variable length code. Switching between the first variable length code and the second variable length code may be made based on the absolute value of a previous sample. For example, switching from the first variable length code to the second variable length code may occur when the absolute value of the previous sample is greater than a predetermined integer greater than 2. The predetermined integer may be 3.

At 424, in run-mode, a combined event is decoded of: length of a zero-run corresponding to a number of zeros since a last non-zero level; and whether the level is greater than one. A switch is made to the level-mode for a next sample when the level is greater than a second threshold. The second threshold may be one (1). In run-mode, when the level is equal to one, decoding may involve decoding the sign bit. When the level is greater than one, decoding may involve decoding the level and sign bit jointly or separately. For example, when the level is greater than one, decoding may involve decoding the combined event of a code equal to 2*(level−2)+sign.

A determination may be made as to whether to switch between level-mode and run-mode based on an indicator contained in the encoded bit-stream. Furthermore, when decoding the combined event, a codeword may indicate end of block when there are no more non-zero samples. As shown in FIG. 5, decoding may involve switching between the level-mode and run-mode until an end of block condition is detected.

At 430, levels and sign bits resulting from the decoding steps 422 and 424 are combined into a one-dimensional array of integer samples in sequential order. Then, at 440, using an inverse scan pattern, the one-dimensional array of integer samples is converted to a two-dimensional array of integer samples representing a block of quantized transform coefficients.

Figure 6:
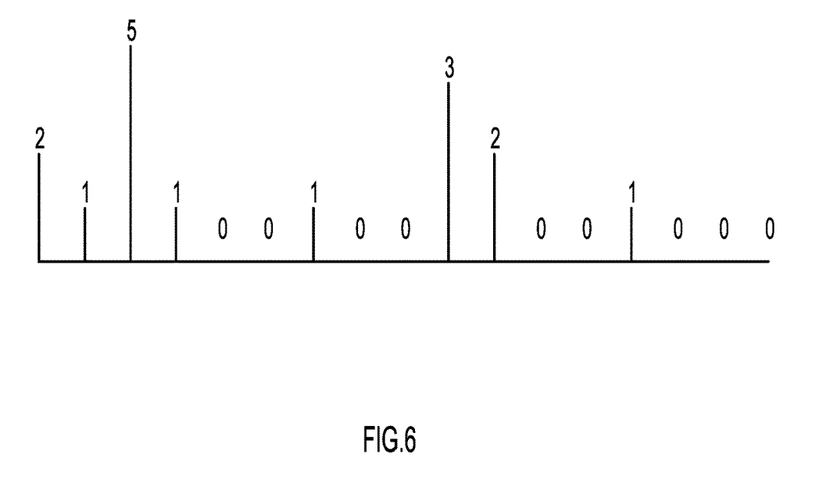
FIG. 6 is a diagram illustrating an example of a one-dimensional array of integer samples encoded according to the techniques presented herein.

Reference is now made to FIG. 6 for an example of the transform coefficient coding scheme described above. FIG. 6 illustrates an example where 16 quantized transform coefficients are encoded. The table below shows the mode, VLC number and symbols to be coded for each coefficient.

TABLE 1

For example of FIG. 6

| Index | abs(coeff) | Mode | VLC | Encoded symbols |
|---|---|---|---|---|
| 0 | 2 | level-mode | 0 | level = 2, sign |
| 1 | 1 | level-mode | 0 | level = 1, sign |
| 2 | 5 | level-mode | 0 | level = 5, sign |
| 3 | 1 | level-mode | 1 | level = 1, sign |
| 4 | 0 | level-mode | 1 | level = 0 |
| 5 | 0 | run-mode | N/A | |
| 6 | 1 | run-mode | N/A | (run = 1, level = 1) |
| 7 | 0 | run-mode | N/A | |
| 8 | 0 | run-mode | N/A | |
| 9 | 3 | run-mode | N/A | (run = 2, level > 1), 2*(3 − 2) + sign |
| 10 | 2 | level-mode | 0 | level = 2, sign |
| 11 | 0 | level-mode | 0 | level = 0 |
| 12 | 0 | run-mode | N/A | |
| 13 | 1 | run-mode | N/A | (run = 1, level = 1) |
| 14 | 0 | run-mode | N/A | EOB |
| 15 | 0 | run-mode | N/A | |

In summary, quantized transform coefficients of a block arranged in a one-dimensional array are encoded. Switching is adaptively made between multiple modes where each mode is characterized by how consecutive coefficients are jointly coded as a single event, including coding each coefficient separately as a possible mode. The mode can be derived implicitly from previously transmitted coefficients, or it can also be transmitted explicitly.

For each mode, switching is adaptively made between various variable length code tables. The variable length code table can be derived implicitly from previously transmitted coefficients or it can be transmitted explicitly. For at least one of the modes and for at least one of the VLC tables, a special binary codeword is received for end-of-block (i.e. no more non-zero coefficients) to terminate the coefficient coding process of the block.

Figure 7:
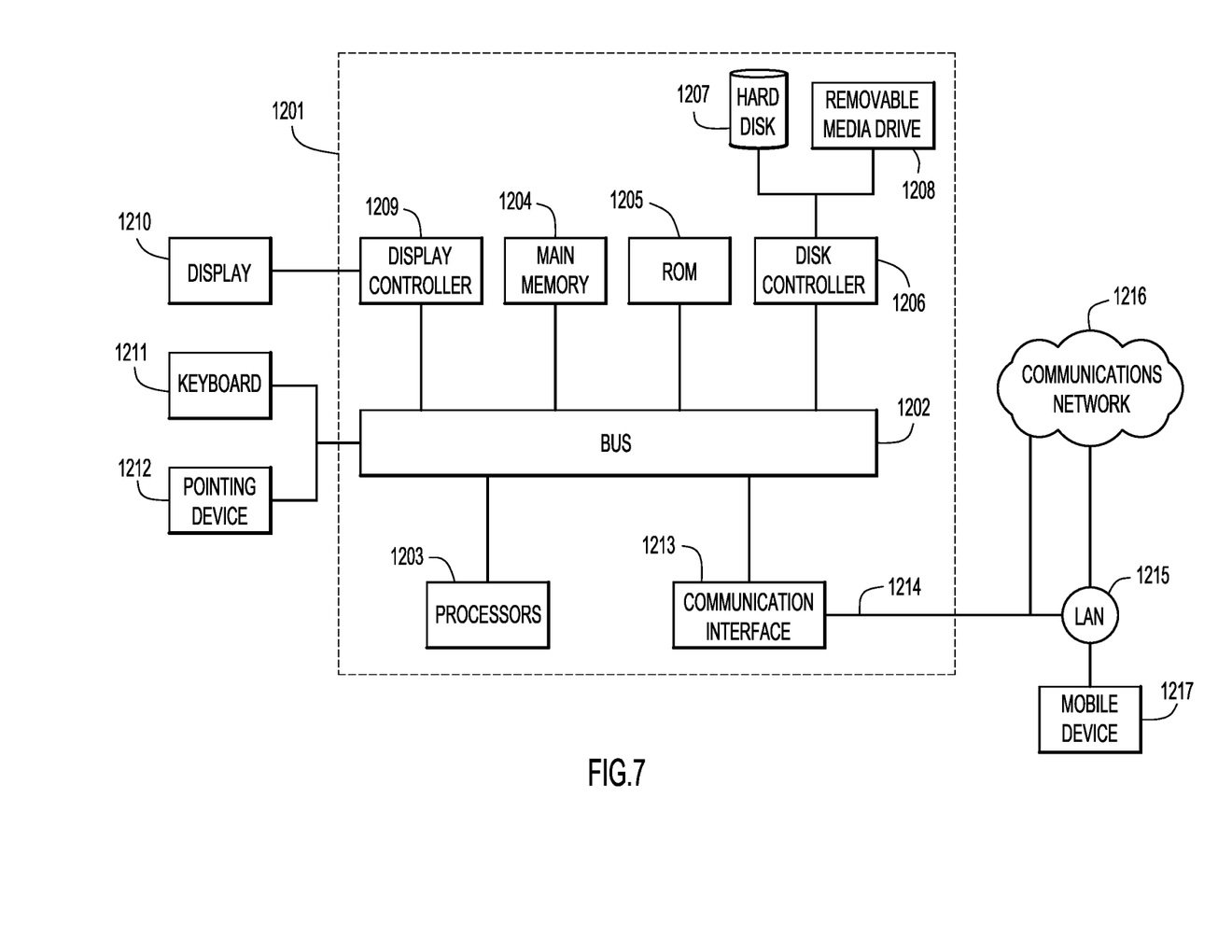
FIG. 7 is a block diagram of a computing device configured to perform the encoding and decoding techniques presented herein, according to an example embodiment.

FIG. 7 illustrates a computer system 1201 upon which an embodiment of the methods presented herein may be implemented. The computer system 1201 may be programmed to implement a computer based device, such as a video conferencing endpoint or any device includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system

1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In summary, in one embodiment, a method is provided comprising: obtaining a two-dimensional array of integer samples representing a block of quantized transform coefficients for a video frame; converting the two-dimensional array of integer samples to a one-dimensional array of integer samples using a scan pattern, wherein each integer sample is represented with a level that is an absolute value of the sample and a sign bit if the level is greater than zero; and converting the one-dimensional array of integer samples to a bit-stream by processing the one-dimensional array of samples in sequential order. Converting the one-dimensional array of samples to a bit-stream comprises: encoding the samples in a level-mode and a run-mode to form an encoded bit-stream. In the level-mode, encoding comprises encoding each sample individually and encoding a level; encoding a sign bit if the level is greater than zero; and switching to the run-mode for a next sample when the level is less than a first threshold. In the run-mode, encoding comprises for each non-zero level, encoding a combined event of: length of a zero-run corresponding to a number of zeros since a last non-zero level; and whether the level is greater than one. A switch is made to the level-mode for the next sample when the level is greater than a second threshold.

In another form, a method is provided comprising: receiving an encoded bit-stream representing video frames; and decoding levels and sign bits representing quantized coefficients from the encoded bit-stream in a level-mode or a run-mode. In the level-mode, decoding comprises decoding each sample individually by decoding a level from the bit-stream; and if the level is greater than zero, decoding the sign from the bit-stream. If the level is less than a first threshold, a switch is made to the run-mode. In the run-mode, decoding comprises decoding from the bit-stream, a combined event of: length of a zero-run corresponding to a number of zeros since a last non-zero level; and whether the level is greater than one. A switch is made to the level-mode for a next sample when the level is greater than a second threshold. Levels and sign bits resulting from the decoding are combined into a one-dimensional array of integer samples in sequential order. Using an inverse scan pattern, the one-dimensional array of integer samples is converted to a two-dimensional array of integer samples representing a block of quantized transform coefficients. This method may be embodied by one or more non-transitory computer readable storage media encoded with software instructions that, when executed by a processor, cause the processor to perform these operations.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining a two-dimensional array of integer samples representing a block of quantized transform coefficients for a video frame;
converting the two-dimensional array of integer samples to a one-dimensional array of integer samples using a scan pattern, wherein each integer sample is represented with a level that is an absolute value of the sample and a sign bit if the level is greater than zero;
converting the one-dimensional array of integer samples to a bit-stream by processing the one-dimensional array of samples in sequential order, wherein converting the one-dimensional array of samples to a bit-stream comprises:
encoding the samples in a level-mode and a run-mode to form an encoded bit-stream;
wherein in the level-mode:
encoding each sample individually and encoding a level;
encoding a sign bit if the level is greater than zero; and
switching to the run-mode for a next sample when the level is less than a first threshold;
wherein in the run-mode:
for each non-zero level, encoding a combined event of:
length of a zero-run corresponding to a number of zeros since a last non-zero level;
whether the level is greater than one; and
when the level is one, encoding the sign bit;
when the level is greater than one:
encoding the level and sign bit jointly, and
encoding the combined event with a code equal to 2*(level−2)+sign;
switching to the level-mode for the next sample when the level is greater than a second threshold.

2. The method of claim 1, wherein encoding the samples starts in the level-mode.

3. The method of claim 1, wherein in the level-mode, encoding the level uses one of a first variable length code and a second variable length code.

4. The method of claim 3, wherein encoding the level comprises switching between the first variable length code and the second variable length code based on the absolute value of a previous sample.

5. The method of claim 4, wherein switching between the first variable length code and the second variable length code comprises switching from the first variable length code to the second variable length code when the absolute value of the previous sample is greater than a predetermined integer greater than 2.

6. The method of claim 5, wherein the predetermined integer is 3.

7. The method of claim 1, wherein in the run-mode, when the level is equal to one, encoding comprises encoding the sign bit.

8. The method of claim 1, further comprising including an indicator in the encoded bit-stream to indicate to a decoder to switch between the level-mode and the run-mode.

9. The method of claim 1, wherein encoding the combined event comprises including a binary codeword that indicates end of block when there are no more non-zero samples.

10. A method comprising:
receiving an encoded bit-stream representing video frames;
decoding levels and sign bits representing quantized coefficients from the encoded bit-stream in a level-mode or a run-mode;
wherein in the level-mode:
decoding each sample individually by:
decoding a level from the bit-stream;
if the level is greater than zero, decoding the sign from the bit-stream;

if the level is less than a first threshold, switching to the run-mode;
wherein in the run-mode:
 decoding from the bit-stream, a combined event of:
  length of a zero-run corresponding to a number of zeros since a last non-zero level;
  whether the level is greater than one; and
  when the level is one, decoding the sign bit;
 when the level is greater than one:
  decoding the level and sign bit jointly; and
  decoding the combined event of a code equal to 2*(level−2)+sign; and
 switching to the level-mode for a next sample when the level is greater than a second threshold;
combining levels and sign bits resulting from the decoding into a one-dimensional array of integer samples in sequential order; and
using an inverse scan pattern, converting the one-dimensional array of integer samples to a two-dimensional array of integer samples representing a block of quantized transform coefficients.

11. The method of claim 10, wherein in the level-mode, decoding the level uses one of a first variable length code and a second variable length code.

12. The method of claim 11, wherein decoding the level comprises switching between the first variable length code and the second variable length code based on the absolute value of a previous sample.

13. The method of claim 12, wherein switching between the first variable length code and the second variable length code comprises switching from the first variable length code to the second variable length code when the absolute value of the previous sample is greater than a predetermined integer greater than 2.

14. The method of claim 13, wherein the predetermined integer is 3.

15. The method of claim 10, wherein in the run-mode, when the level is equal to one, decoding comprises decoding the sign bit.

16. The method of claim 10, further comprising determining whether to switch between level-mode and run-mode based on an indicator contained in the encoded bit-stream for a video frame.

17. The method of claim 10, wherein in the run-mode, decoding comprises decoding the combined event that further includes a codeword that indicates end of block when there are no more non-zero samples.

18. One or more non-transitory computer readable storage media encoded with software instructions that, when executed by a processor, cause the processor to perform operations comprising:
 receiving an encoded bit-stream representing video frames;
 decoding levels and sign bits representing quantized coefficients from the encoded bit-stream in a level-mode or a run-mode;
 wherein in the level-mode:
  decoding each sample individually by:
   decoding a level from the bit-stream;
   if the level is greater than zero, decoding the sign from the bit-stream;
  if the level is less than a first threshold, switching to the run-mode;
 wherein in the run-mode:
  decoding from the bit-stream, a combined event of:
   length of a zero-run corresponding to a number of zeros since a last non-zero level;
   whether the level is greater than one; and
   when the level is one, decoding the sign bit;
  when the level is greater than one:
   decoding the level and sign bit jointly; and
   decoding the combined event of a code equal to 2*(level−2)+sign; and
  switching to the level-mode for a next sample when the level is greater than a second threshold;
 combining levels and sign bits resulting from the decoding into a one-dimensional array of integer samples in sequential order; and
 using an inverse scan pattern, converting the one-dimensional array of integer samples to a two-dimensional array of integer samples representing a block of quantized transform coefficients.

19. The non-transitory computer readable storage media of claim 18, wherein the instructions for decoding, in the level-mode, the level include instructions for decoding using one of a first variable length code and a second variable length code.

20. The non-transitory computer readable storage media of claim 19, wherein the instructions for switching between the first variable length code and the second variable length code is based on the absolute value of a previous sample.

21. The non-transitory computer readable storage media of claim 20, wherein switching between the first variable length code and the second variable length code comprises switching from the first variable length code to the second variable length code when the absolute value of the previous sample is greater than a predetermined integer greater than 2.

22. The non-transitory computer readable storage media of claim 21, wherein the predetermined integer is 3.

23. The non-transitory computer readable storage media of claim 18, wherein in the run-mode, when the level is equal to one, decoding comprises decoding the sign bit.

24. The non-transitory computer readable storage media of claim 18, wherein instructions further cause the processor to perform operations comprising determining whether to switch between level-mode and run-mode based on an indicator contained in the encoded bit-stream for a video frame.

25. The non-transitory computer readable storage of media of claim 18, wherein in the run-mode, decoding comprises decoding the combined event that further includes a codeword that indicates end of block when there are no more non-zero samples.

* * * * *

UNITED STATES PATENT AND TRADEMARK OFFICE
CERTIFICATE OF CORRECTION

PATENT NO. : 10,171,810 B2
APPLICATION NO. : 14/995512
DATED : January 1, 2019
INVENTOR(S) : Arild Fuldseth et al.

Page 1 of 1

It is certified that error appears in the above-identified patent and that said Letters Patent is hereby corrected as shown below:

On the Title Page

Item (63) Related U.S. Application Data:
Please replace "Continuation of application No. 62/182,852, filed on Jun. 22, 2015." with
--Provisional application No. 62/182,852, filed on Jun. 22, 2015.--

In the Claims

Claim 1, Column 10, Line 26, replace "jointly," with --jointly;--
Claim 1, Column 10, Line 28, replace "2*(level-2)+sign;" with --2*(level-2) + sign;--

Claim 10, Column 11, Line 12, replace "2*(level-2)+sign;" with --2*(level-2) + sign;--

Claim 18, Column 11, Line 56, replace "quantized coefficiets" with --quantized transform coefficients--
Claim 18, Column 12, Line 17, replace "2*(level-2)+sign;" with --2*(level-2) + sign;--

Signed and Sealed this
Twelfth Day of February, 2019

Andrei Iancu
*Director of the United States Patent and Trademark Office*